United States Patent
Inoue et al.

(10) Patent No.: US 11,995,835 B2
(45) Date of Patent: May 28, 2024

(54) PIXEL-LEVEL OBJECT DETECTION SYSTEM AND PROGRAM THEREOF

(71) Applicant: Hitachi Systems, Ltd., Tokyo (JP)

(72) Inventors: Yuki Inoue, Tokyo (JP); Hiroto Nagayoshi, Tokyo (JP); Masato Nakamura, Tokyo (JP)

(73) Assignee: HITACHI SYSTEMS, LTD., Tokyo (JP)

( * ) Notice: Subject to any disclaimer, the term of this patent is extended or adjusted under 35 U.S.C. 154(b) by 480 days.

(21) Appl. No.: 17/229,980

(22) Filed: Apr. 14, 2021

(65) Prior Publication Data

US 2021/0334981 A1    Oct. 28, 2021

(30) Foreign Application Priority Data

Apr. 23, 2020 (JP) ................................ 2020-076486

(51) Int. Cl.
*G06T 7/00* (2017.01)
*G06N 5/04* (2023.01)
*G06N 20/00* (2019.01)
*G06T 7/11* (2017.01)
*G06T 7/136* (2017.01)
*G06T 7/187* (2017.01)
*G06V 10/25* (2022.01)

(52) U.S. Cl.
CPC ................. *G06T 7/11* (2017.01); *G06N 5/04* (2013.01); *G06N 20/00* (2019.01); *G06T 7/136* (2017.01);
(Continued)

(58) Field of Classification Search
CPC . G06T 7/11; G06T 7/136; G06T 7/187; G06T 2200/24; G06T 2207/20076;
(Continued)

(56) References Cited

U.S. PATENT DOCUMENTS

2014/0210944 A1* 7/2014 Jeong ................... H04N 13/264
348/43
2017/0287137 A1* 10/2017 Lin ....................... G06V 10/454
(Continued)

FOREIGN PATENT DOCUMENTS

CN      110176027 A     8/2019
CN      113239800 A     8/2021
(Continued)

OTHER PUBLICATIONS

Singaporean Office Action received in corresponding Singaporean Application No. 10202103778X dated Sep. 14, 2022.
(Continued)

*Primary Examiner* — Ping Y Hsieh
*Assistant Examiner* — Xiao Liu
(74) *Attorney, Agent, or Firm* — MATTINGLY & MALUR, PC

(57) ABSTRACT

A pixel-level object detection system that detects an object at a pixel level, includes: an imaging unit that acquires an inference image that is an image that captures a detection target; an area detection unit that detects an area including a detection target from the inference image; a detail detection unit that detects the detection target using only local information from the inference image; and a result integration processing unit that integrates an output of the area detection unit with an output of the detail detection unit to output a segmentation map indicating, as a probability map, which pixel in the image corresponds to the detection object.

12 Claims, 17 Drawing Sheets

(52) U.S. Cl.
CPC .............. *G06T 7/187* (2017.01); *G06V 10/25* (2022.01); *G06T 2200/24* (2013.01); *G06T 2207/20076* (2013.01); *G06T 2207/20081* (2013.01)

(58) Field of Classification Search
CPC ............ G06T 2207/20081; G06N 5/04; G06N 20/00; G06V 10/25
See application file for complete search history.

(56) References Cited

U.S. PATENT DOCUMENTS

| | | | |
|---|---|---|---|
| 2020/0211200 A1* | 7/2020 | Xu | G06V 10/26 |
| 2020/0258223 A1* | 8/2020 | Yip | G06T 7/11 |
| 2021/0398294 A1 | 12/2021 | Cui et al. | |

FOREIGN PATENT DOCUMENTS

| | | |
|---|---|---|
| JP | 2016-099668 A | 5/2016 |
| JP | 2017-219314 A | 12/2017 |
| JP | 2019-8830 A | 1/2019 |
| JP | 2019-028887 A | 2/2019 |
| JP | 2019-66265 A | 4/2019 |
| JP | 2020-038574 A | 3/2020 |
| KR | 10-1805318 W | 12/2017 |

OTHER PUBLICATIONS

Indian Office Action received in corresponding Indian Application No. 202124017286 dated Mar. 30, 2022.
Japanese Office Action received in corresponding Japanese Application No. 2020-076486 dated Feb. 6, 2024.

* cited by examiner

F I G. 2
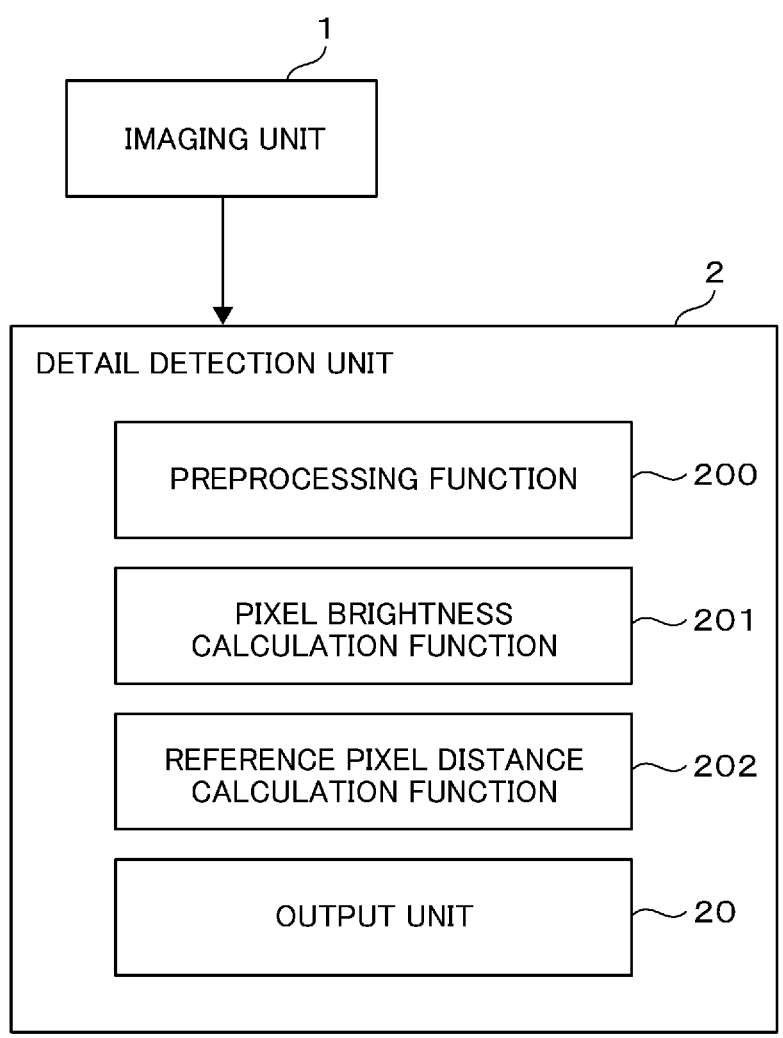

AREA SPECIFIED TYPE ANNOTATION

5002

▨ ANNOTATED PIXELS

■ PIXELS CORRESPONDING TO TARGET OBJECT AND ANNOTATED

LOCAL DETECTION MAP

5011

■ PIXELS CORRESPONDING TO TARGET OBJECT AND ANNOTATED

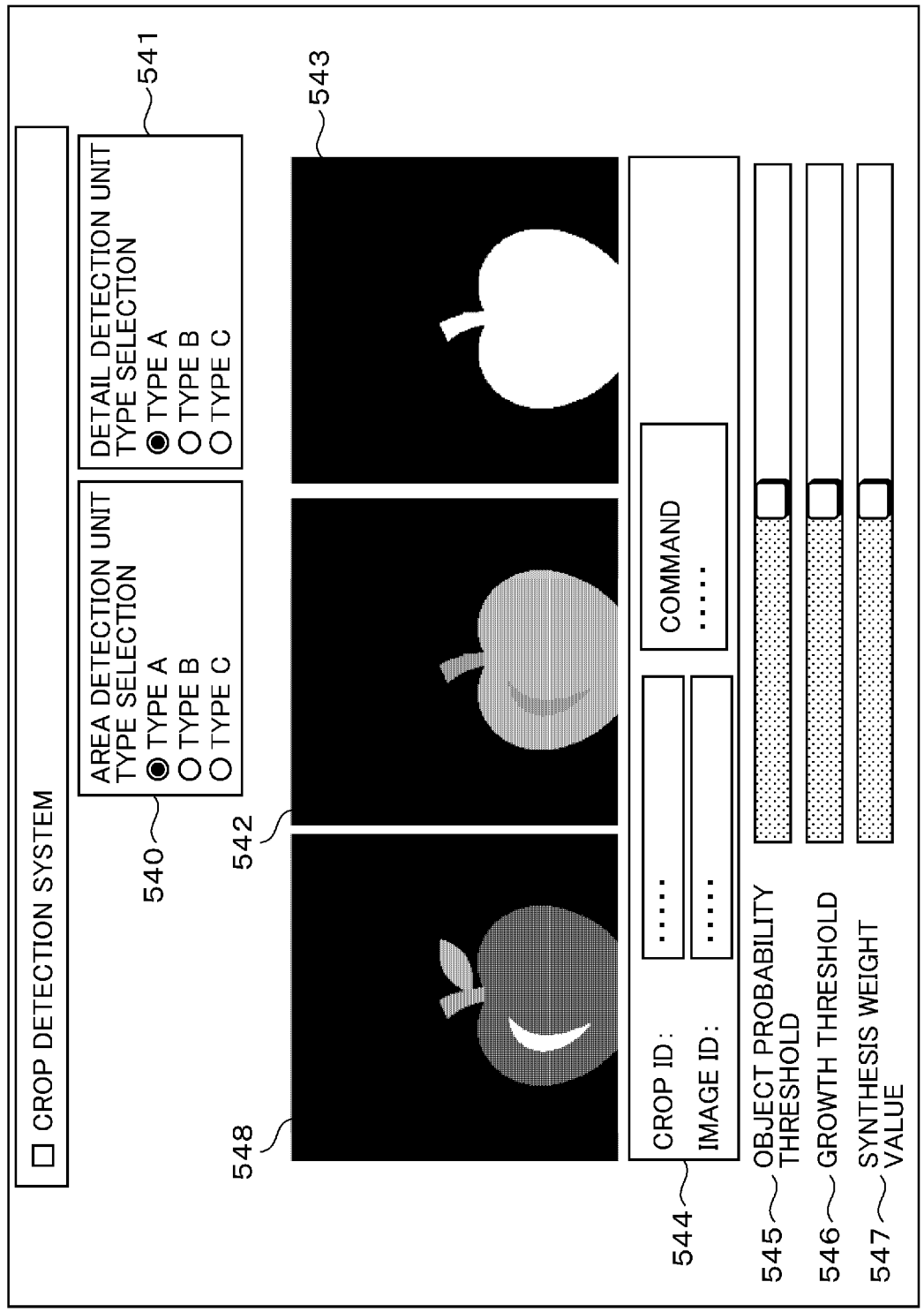

F I G. 1 4
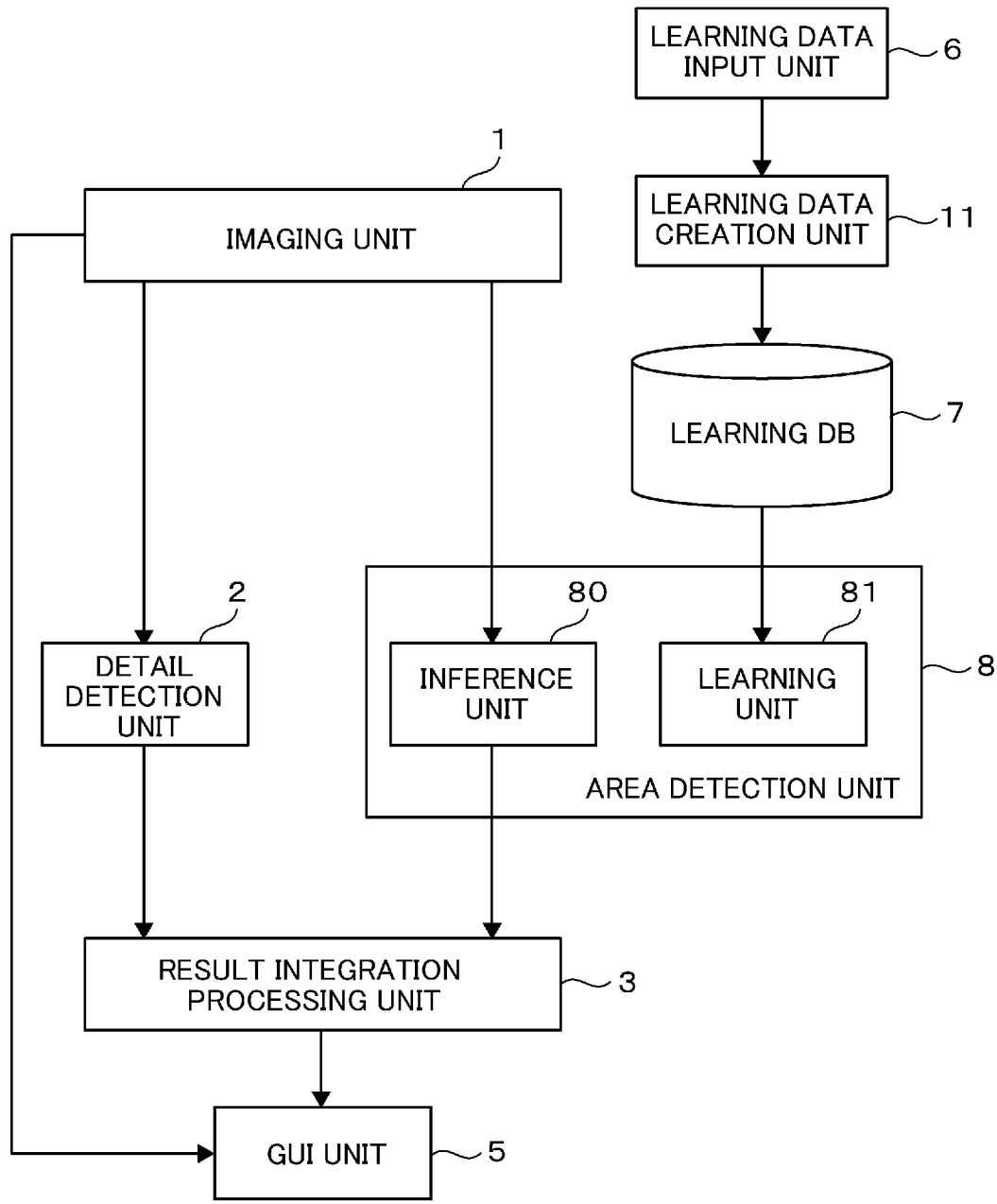

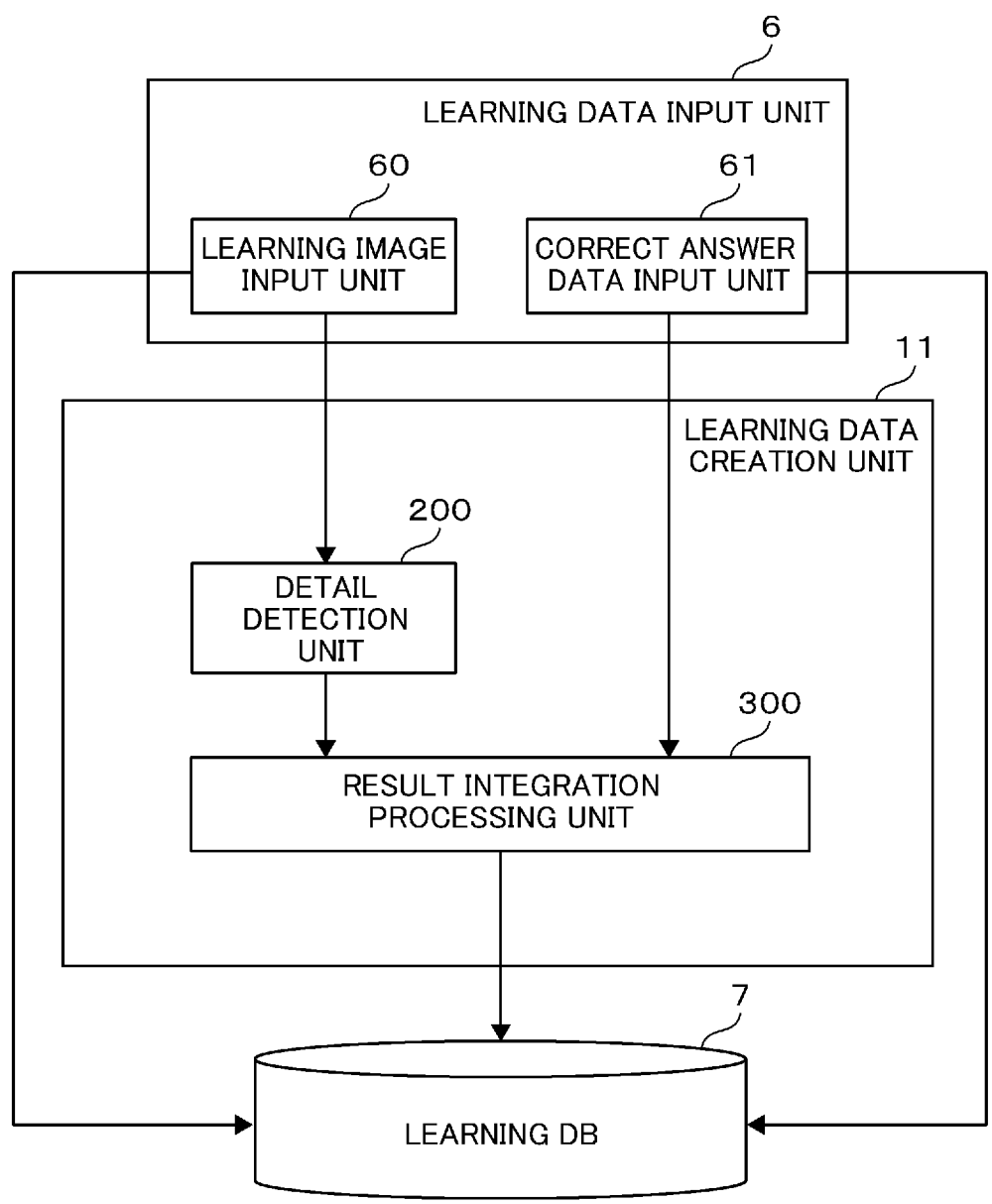
F I G. 1 5

PIXEL-LEVEL OBJECT DETECTION SYSTEM AND PROGRAM THEREOF

CROSS-REFERENCE TO RELATED APPLICATION

The present application claims priority from Japanese application JP2020-076486, filed on Apr. 23, 2020, the contents of which is hereby incorporated by reference into this application.

BACKGROUND OF THE INVENTION

This invention relates to a pixel level object detection technology that detects an object at a pixel level.

In recent years, object recognition from images using computer vision has been applied to various services. Among the services, problem setting called "semantic segmentation", which classifies the object category for each pixel in images, is used in a large number of scenes because it can provide rich output results for thorough analysis. However, in order to perform recognition at a pixel level, it is necessary to teach a recognizer about correct and incorrect answers at the pixel level, and the cost required for collecting such annotations tends to be high. Therefore, there is an increasing need to create learning data with low man-hours while maintaining high accuracy of the recognizer.

Examples of the prior work related to the above technology include Japanese Unexamined Patent Application Publication No. 2019-66265 and Japanese Unexamined Patent Application Publication No. 2017-219314. Both patent literatures disclose two step method to select pixels of interest from images. First, after target pixels are selected by some method (typically data-driven models), selected pixels that are spatially adjacent to each other are clustered together to form pixel groups. Second, for each group that forms, further tests are applied to determine whether or not it is an area of interest.

SUMMARY OF THE INVENTION

In Japanese Unexamined Patent Application Publication Nos. 2019-66265 and 2017-219314, the decision in step two are made per pixel groups. In other words, it is not possible to improve or refine a pixel group during step two. This is problematic for case in which pixel groups are composed of target pixels and non-target pixels heavily mixed together. Therefore, in the system of the patent documents disclosed above, it is crucial that the method used in step one be highly accurate, so that the pixel groups do not contain non-target pixels. Because reduction in data annotation negatively affect the accuracy of the method used in step one, the above mentioned inventions are not capable to maintaining high accuracy while reducing the annotation cost.

The objective of the present invention is to provide a technique that is capable of suppressing a decrease in inference accuracy even without providing highly detailed training data, for a pixel-level object detection method.

To solve the above problem, according to the present invention, there is provided a pixel-level object detection system that detects an object at a pixel level, including: an imaging unit that acquires an inference image that is an image that captures a detection target; the area detection unit that detects the area including the detection target from the inference image; a detail detection unit that detects the detection target using only local information from the inference image; and a result integration processing unit that integrates an output of the area detection unit with an output of the detail detection unit to output a segmentation map showing, as a probability map, which pixel in the image corresponds to the detection object.

According to the present invention, a decrease in inference accuracy can be suppressed even without giving detailed information at the time of creation of learning data in the pixel-level object detection technology.

BRIEF DESCRIPTION OF THE DRAWINGS

FIG. 2 is a diagram showing a configuration of a detail detection unit and a relationship of the detail detection unit with other units;

FIG. 13 is a diagram showing a display example of a GUI screen according to the fourth embodiment;

FIG. 14 is a diagram showing a configuration of a pixel-level object detection system according to a fifth embodiment; and FIG. 15 is a diagram showing a configuration of a learning data creation unit and a relationship of the learning data creation unit with other units according to the fifth embodiment.

DETAILED DESCRIPTION OF THE PREFERRED EMBODIMENTS

Hereinafter, embodiments of the present invention will be described with reference to the drawings. The following descriptions and drawings are examples for describing the present invention, and are appropriately omitted and simplified for clarification of the description. The present invention can also be implemented in various other forms. Each component can be single or multiple, unless otherwise limited.

In the following description, various information may be described by expressions such as "table" and "list", but various information may be expressed in a data structure other than those pieces of information. "XX table", "XX list", and so on are called "XX information" to show that the information does not depend on the data structure. When describing identification information, expressions such as "identification information", "identifier", "name", "ID", "number", and so on are used, but those expressions can be replaced with each other.

In each figure to describe the embodiments, the same components are denoted by the same names and signs and a repetitive description may be omitted.

First Embodiment

Figure 1:
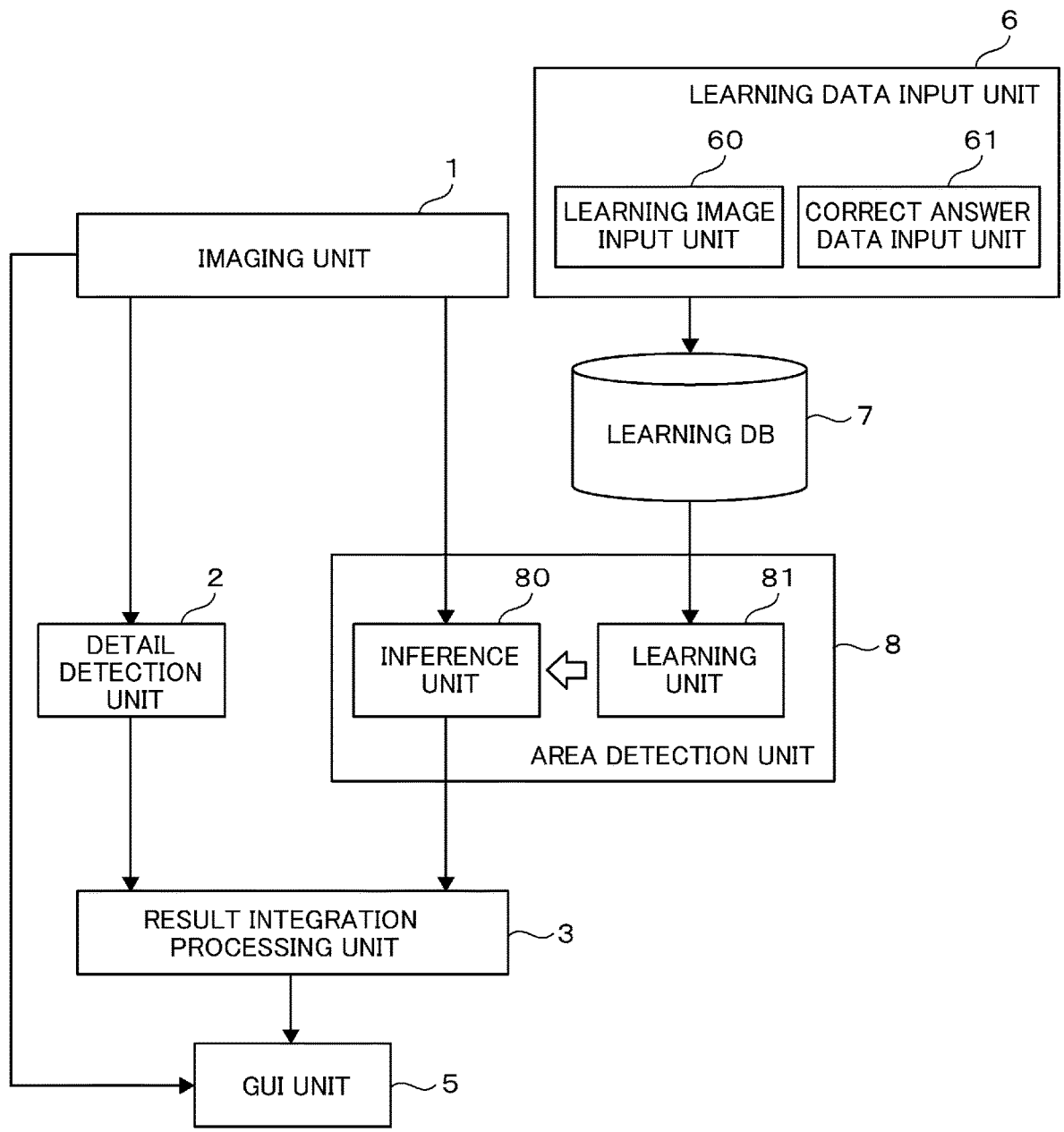
FIG. 1 is a diagram showing a configuration of a pixel-level object detection system according to a first embodiment of the present invention.

A pixel-level object detection system according to a first embodiment of the present invention will be described in detail with reference to the drawings. FIG. 1 is a system configuration diagram showing an overall image of a pixel-level object detection system.

The pixel-level object detection system includes an imaging unit 1 that aggregates a 2D (two-dimensional) image (inference image: original image) that captures an object, a learning data input unit 6 that creates information (correct answer data) on whether or not a pixel corresponds to the object in a 2D image group (learning image) acquired in advance, a learning database (DB: Database) 7 that accumulates created learning data together with accompanying information, an area detection unit 8 that detects a pixel area (area detection map) corresponding to the object in the original image based on the accumulated learning data and accompanying information, a detail detection unit 2 that outputs local detection information (local detection map) from the original image without using the accumulated learning data, a result integration processing unit 3 that integrates a local detection map that is an output of the detail detection unit 2 with an area detection map that is an output of the area detection unit 8, and outputs as a probability map (segmentation map) which pixel in the image corresponds to the detection object, and a graphical user interface (GUI) unit 5 that visualizes the output segmentation map.

The details of the detail detection unit 2 will be described later with reference to FIG. 2, the details of the result integration processing unit 3 will be described later with reference to FIG. 5, the details of a GUI unit 5 will be described later with reference to FIG. 7, and the details of the learning DB 7 will be described later with reference to FIG. 4.

The imaging unit 1 is, for example, a camera or the like that images a detection object and outputs an inference image (original image), which is a 2D (two-dimensional) image.

FIG. 2 shows a configuration of the detail detection unit 2 and a relationship of the detail detection unit 2 with other units. The detail detection unit 2 receives the inference image from the imaging unit 1 as an input, detects a detection target for each minority pixel that is local information, for example, for each pixel, and outputs a local detection map from the output unit 20. The number of pixels to be detected may be not limited to one pixel, but may be multiple pixels in a narrow area.

A method of creating the local detection map by the detail detection unit 2 has two stages. First, in a first stage, sharpening filter processing, which is existing filter processing, and histogram flattening may be performed for each pixel or for each minority pixels (preprocessing function 200). Then, in a second stage, the brightness of each pixel is calculated (pixel brightness calculation function 201), or a distance of each pixel from a pre-set pixel, for example, a distance of color is calculated (reference pixel distance calculation function 202). Then, the output unit 20 outputs the obtained result as a local detection map.

The learning data input unit 6 in FIG. 1 includes a learning image input unit 60 that receives a 2D image group (learning image) acquired in advance, and includes a correct answer data input unit 61 that receives information (correct answer data) on whether or not the pixels configuring each learning image correspond to an object. In addition, the learning data input unit 6 outputs an aggregation of pairs of the learning images and the correct answer data as learning data.

Figure 3A:
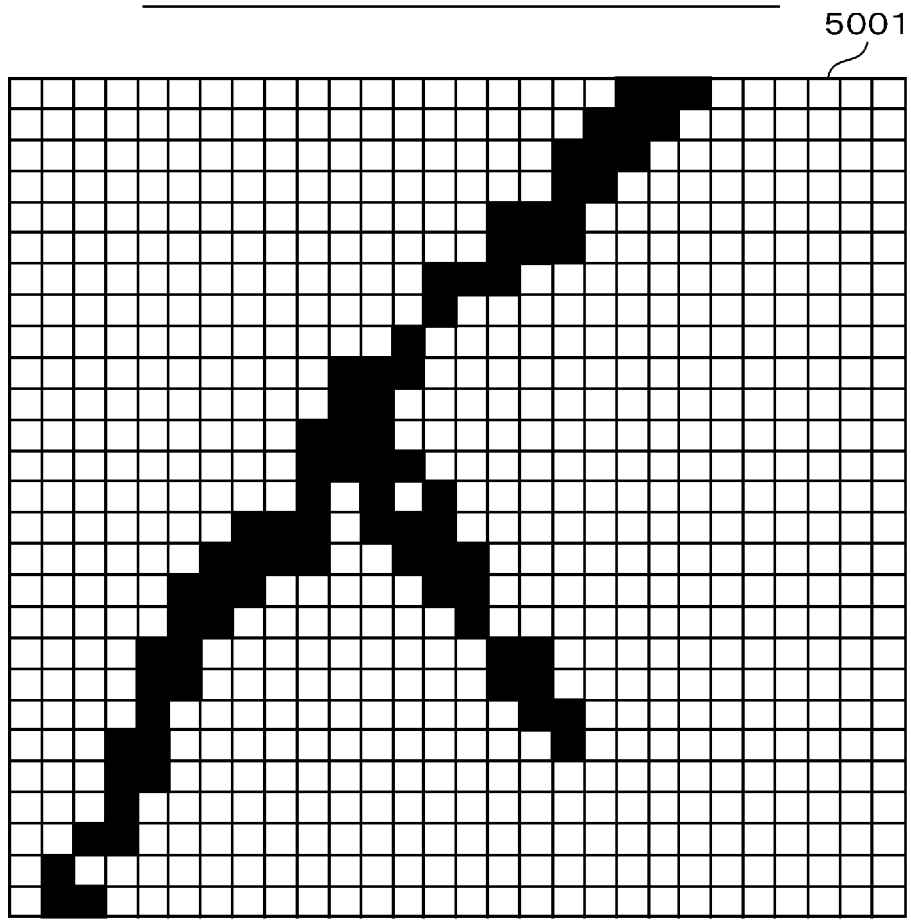
FIG. 3A is a diagram showing an example of a pixel fully specified type annotation method.
Figure 3B:
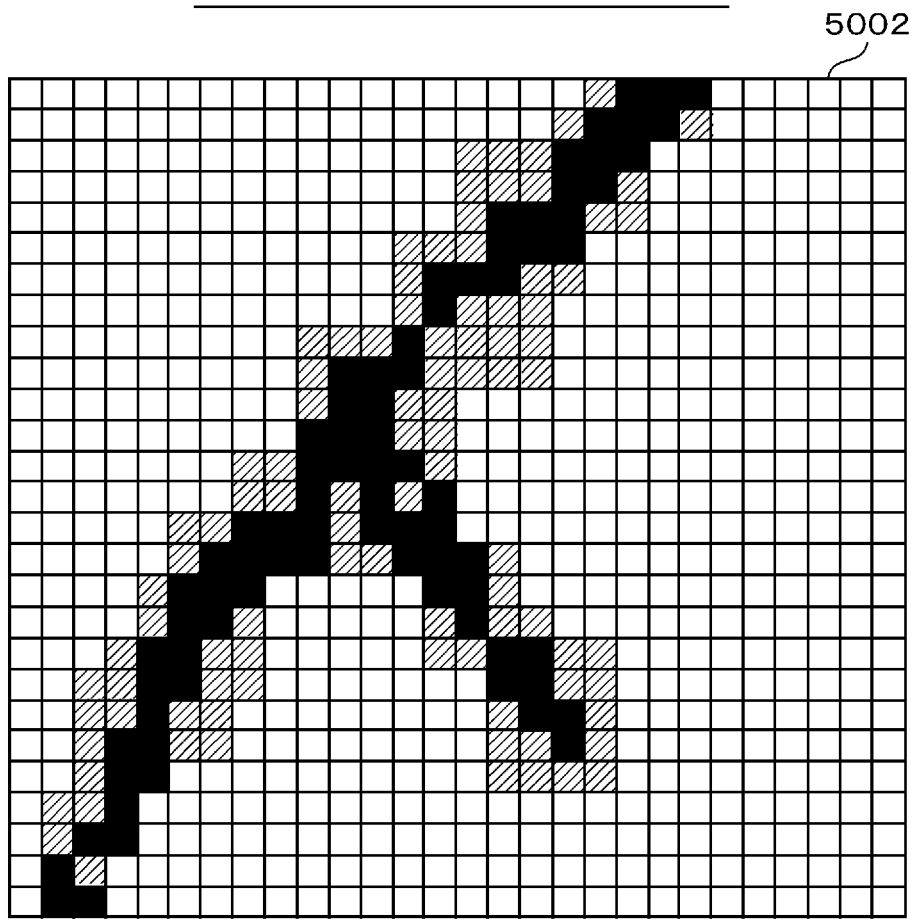
FIG. 3B is a diagram showing an example of an area specified type annotation method.

FIGS. 3A and 3B show an output example of the correct answer data input unit 61. In a pixel fully specified type annotation example 5001 of FIG. 3A, pixels corresponding to a target object are annotated without excess and deficiency. On the other hand, in an area specified type annotation example 5002 of FIG. 3B, pixels that do not correspond to the target object are also annotated. In the present specification, annotation generally means creating teacher data from the original image. In the conventional configuration, since there is a need to include detailed information in the learning data, the annotation has to be performed without excess or deficiency, such as the pixel fully specified type annotation 5001, but in the configuration of the present invention, detailed information is formulated by the detail detection unit 2 that does not use the learning data, the object can be detected with high accuracy even with the correct answer data such as the area specified type annotation 5002 that does not include detailed information. Therefore, in the present invention, the correct answer data annotated by either the fully specified type annotation 5001 or the area specified type annotation 5002 may be used as an input.

The area detection unit 8 of FIG. 1 receives an inference image from the imaging unit 1, and outputs a probability that each pixel included in the inference image corresponds to the object, and creates an image (area detection map) in which the inference probability and the pixel value are proportional. Then, the area detection unit 8 outputs the area detection map. The area detection unit 8 may perform processing of detecting an area including the detection target based on pixels in a wide area the number of which is larger than the number of pixels detected by the detail detection unit 2.

The data used as a determination material when creating the area detection map is learning data accumulated in the learning DB 7. Details of the learning DB 7 will be described later with reference to FIG. 4. A method of referring to the learning DB 7 depends on the form of the area detection unit 8, and for example, if the area detection unit 8 uses model parameters such as machine learning models (value groups used during output calculation), parameter adjustment may be performed with using the learning data in advance. Further, for example, if the area detection unit 8 does not hold model parameters such as the nearest neighbor method and refers to the learning data at the time of inference, the learning DB 7 may be appropriately referred to at the time of inference.

The area detection unit 8 includes a learning unit 81 and an inference unit 80, and the learning unit 81 performs machine learning and the like with using the learning data accumulated in the learning DB 7. Then, the inference unit 80 infers the area detection map from the inference image input from the imaging unit with using the learning result.

Figure 4:
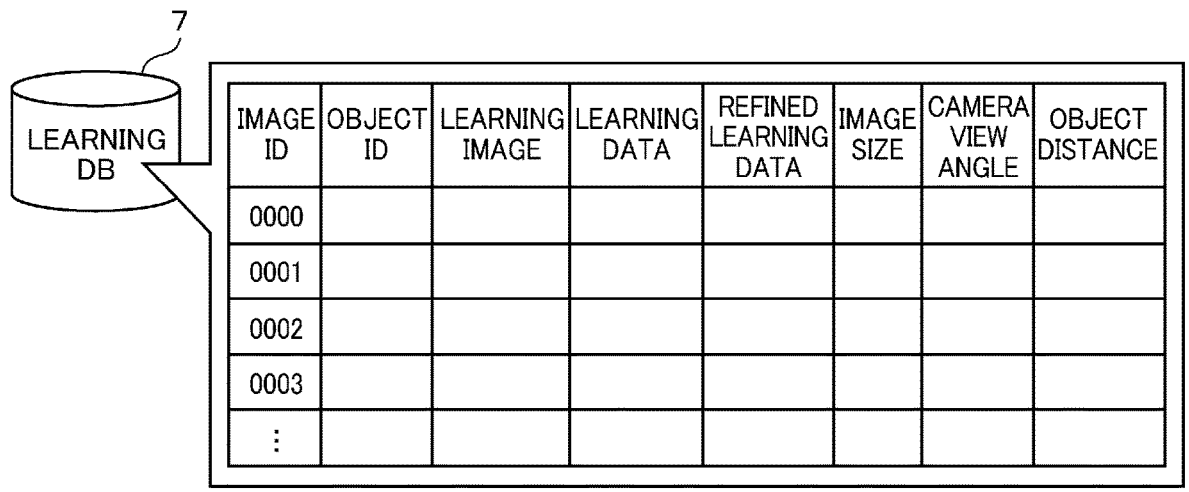
FIG. 4 is a diagram shows an example of the data configuration accumulated in a learning database.

FIG. 4 shows an example of a data configuration accumulated in the learning DB 7. The data accumulated in the learning DB 7 includes information provided by the learning data input unit 6, and includes data such as an image ID, an object ID indicating the detection object, a learning image, an image size, a camera angle of view, and an object distance. In addition to the above pieces of information, the learning DB 7 also accumulates correct answer data that is an image indicating whether or not each pixel corresponds the object output by the learning data input unit 6. Furthermore, in the case of the fifth embodiment, the learning DB 7 also accumulates data such as refined correct answer data output by the learning data creation unit 11 which will be described later.

Figure 5:
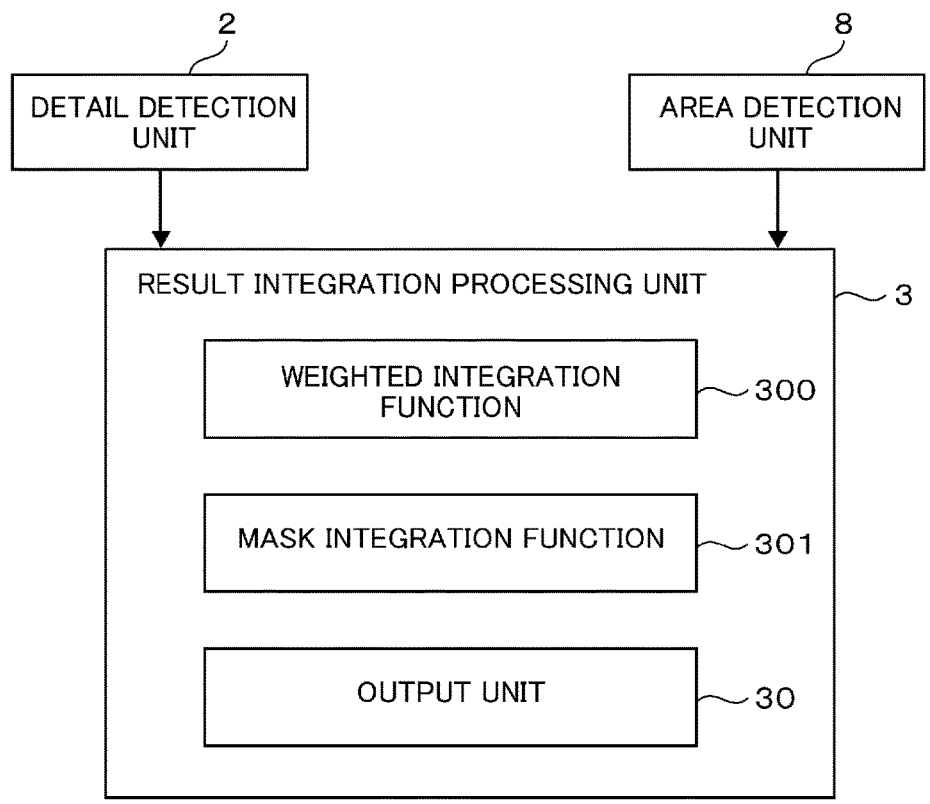
FIG. 5 is a diagram showing a configuration of a result integration processing unit and a relationship of the result integration processing unit with other units.

FIG. 5 shows a configuration of the result integration processing unit 3 and a relationship of the result integration processing unit 3 with other units. The result integration processing unit 3 receives the local detection map from the detail detection unit 2 and the area detection map from the area detection unit 8 as inputs. Then, the result integration processing unit 3 integrates those inputs and outputs the segmentation map from the output unit 30.

The segmentation map creation method of the result integration processing unit 3 in the present invention is one of the following methods.

1. A weighted integration function 300 that weights and synthesizes the local detection map and the area detection map based on a weight value of 0 or more and 1 or less set by a weighted synthesis ratio setting function 506 or the like of the GUI unit 5 to be described later. The weighted synthesis in this example is to multiply the pixel value of the local detection map by the weight value, multiply the pixel value of the area detection map by (1-weight value), and add the two results.

2. A mask integration function 301 that performs threshold processing with using thresholds set for one or both of the local detection map and the area detection map, and integrates the results together with using mask processing.

Figure 6A:
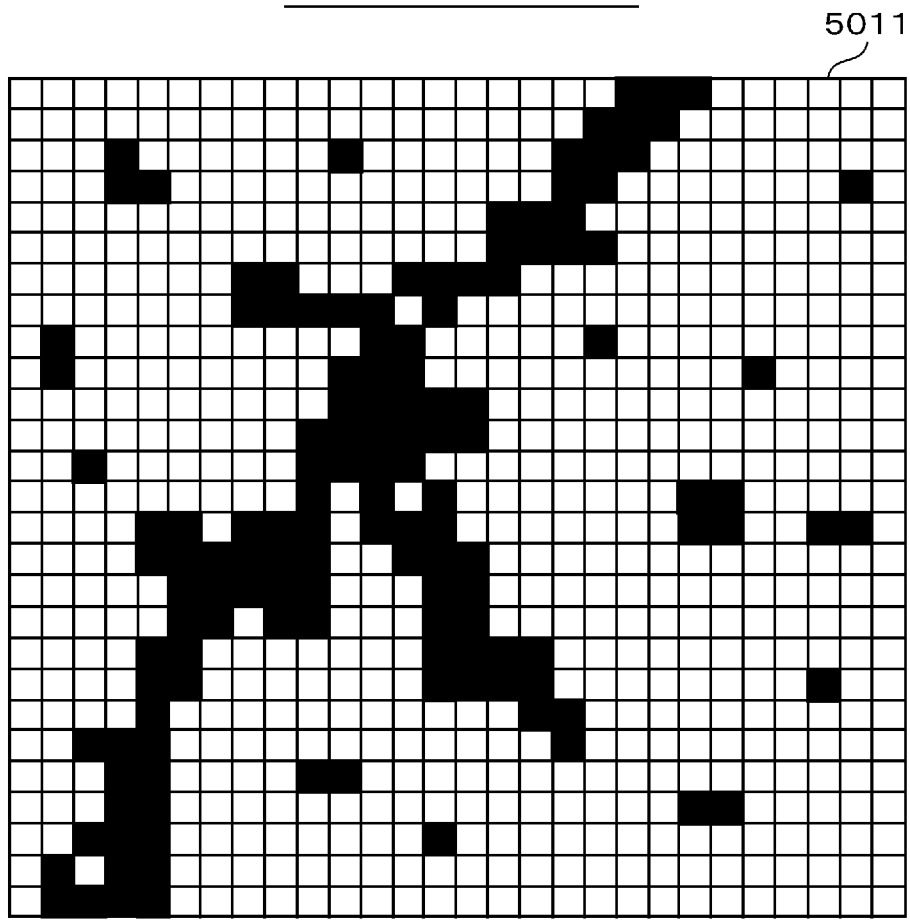
FIG. 6A is a diagram showing an example of a local detection map.
Figure 6B:
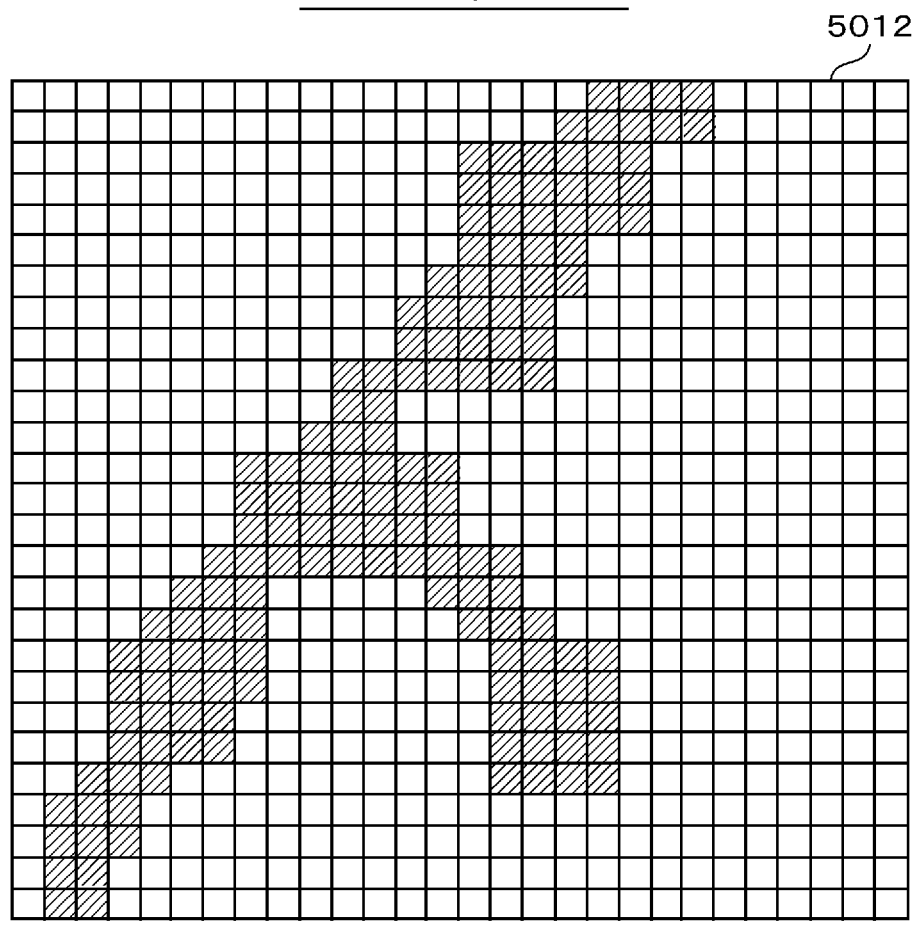
FIG. 6B is a diagram showing an example of an area detection map.
Figure 6C:
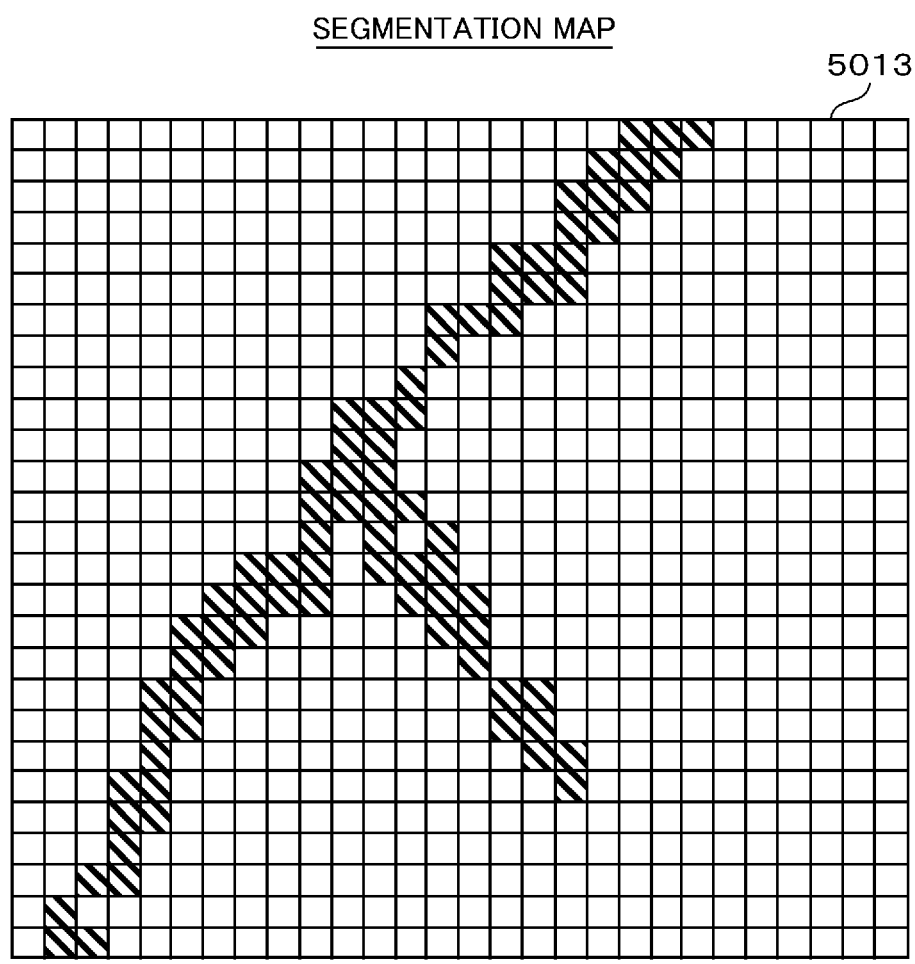
FIG. 6C is a diagram showing an example of a segmentation map.

FIGS. 6A to 6C are diagrams showing examples of the local detection map, the area detection map, and the segmentation map. A segmentation map example 5013 of FIG. 6C outputs pixels each with a high detection probability in both maps of FIGS. 6A and 6B among pixels configuring a local detection map example 5011 of FIG. 6A and an area detection map example 5012 of FIG. 6B. Note that the map in the figure is binarized for simplification, but is actually a probability value and thus a real number. Further, although the map in the figure shows a case where mask processing is performed on the binarized input, as described above, the processing of the actual result integration processing unit 3 is not limited to mask processing.

In the local detection map of FIG. 6A, since the detection processing of the detection target is performed for each small number of pixels, for example, each pixel, pixels other than the detection object are also detected by noise or the like. In the area detection map of FIG. 6B, since the detection processing of the object is performed based on pixels in a wide area the number of which is larger than the pixels detected by the detail detection unit 2, a large area including the detection object is detected, and noise in a small area is not detected. In the segmentation map of FIG. 6C, only the detection object can be detected by matching the local detection map of FIG. 6A with the area detection map of FIG. 6B.

Figure 7:
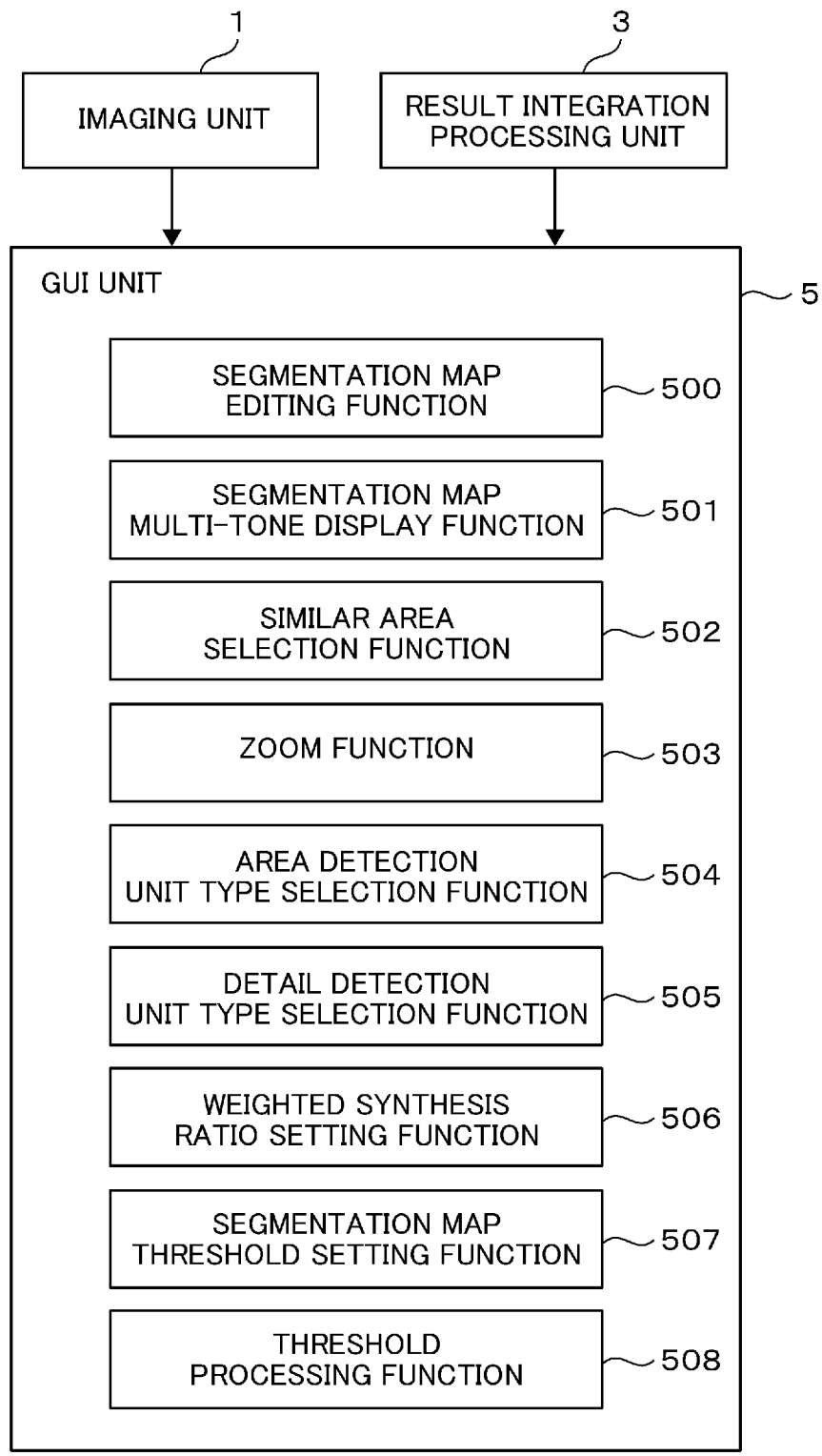
FIG. 7 is a diagram showing a configuration of a GUI unit and a relationship of the GUI unit with other units.

FIG. 7 shows a configuration of the GUI unit 5 and a relationship of the GUI unit 5 with other units. The GUI unit 5 enters, in addition to the inference image output from the imaging unit 1, a segmentation map output from the result integration processing unit 3 as an input. The GUI unit 5 takes the form of a GUI (Graphical User Interface), and has the following functions so that a person (user) who operates the GUI can efficiently view the detection results.

(1) A segmentation map editing function 500 of editing the segmentation map entered.

(2) A segmentation map multi-tone display function 501 of displaying the probability that each pixel corresponds to the object, which is defined by the segmentation map, as a multi-tone image.

(3) A threshold processing function 508 of processing a segmentation map by a threshold specified by the user from the segmentation map setting function 507.

(4) A similar area selection function 502 of allowing similar pixels to be selected at once based on RGB information of the original image or probability information defined in the segmentation map.

(5) A zoom function 503 of enlarging a part of the display image by user operation.

(6) An area detection unit type selection function 504 of changing a processing flow of the area detection unit 8.

(7) A detail detection unit type selection function 505 of changing a processing flow of the detail detection unit 2.

(8) A weighted synthesis ratio setting function 506 of setting the synthetic weight value described above.

Figure 8:
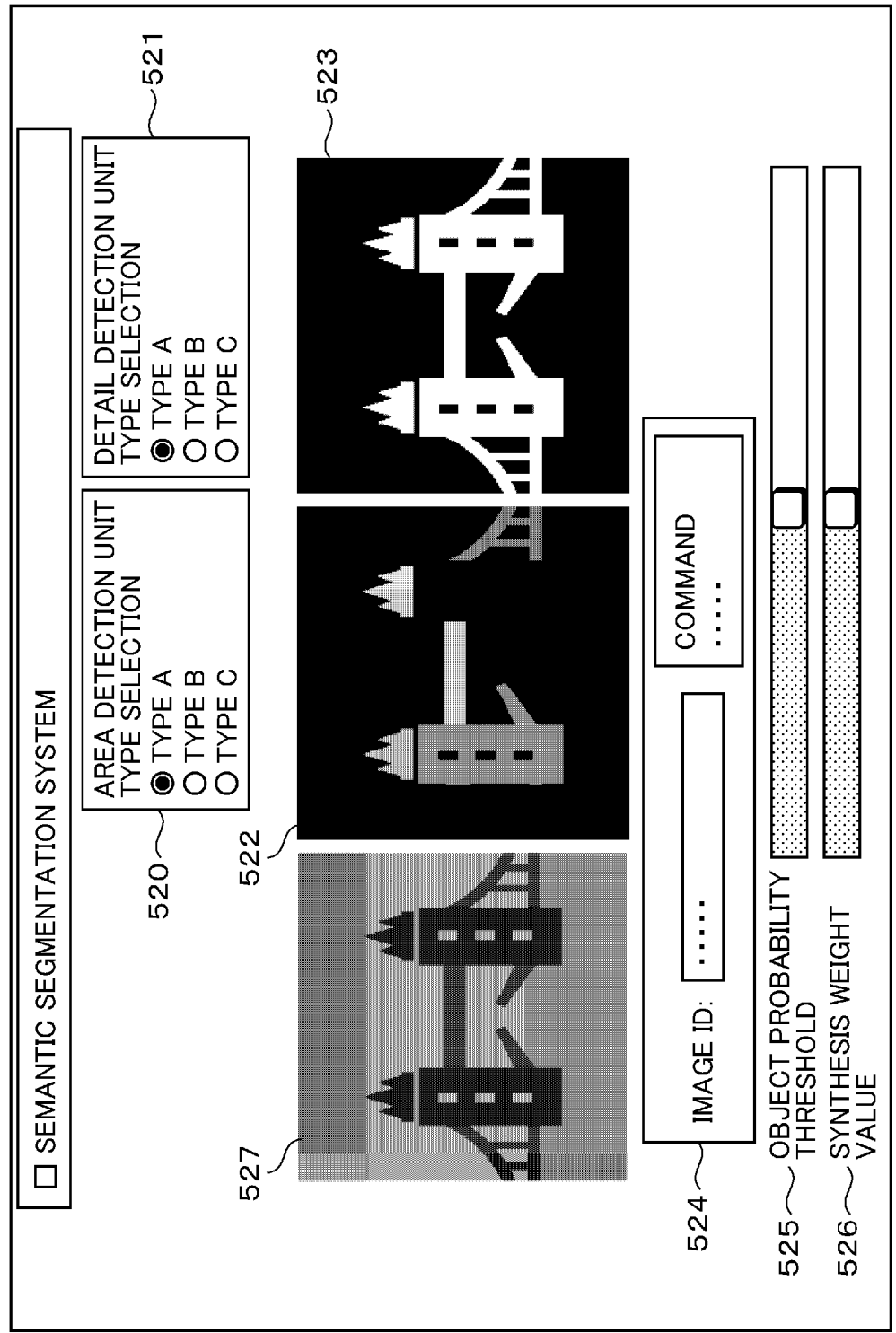
FIG. 8 is a diagram showing a display example of a GUI screen.

FIG. 8 shows an example of a GUI screen visualized in the GUI unit 5. First, the GUI screen displays an inference image (original image) represented by a part 527, a segmentation map multi-tone display image that visualizes an "object-likeness" of each pixel by making an object probability represented by a part 522 proportional to a pixel value, and a threshold-processed image in which a multi-tone image represented by a part 523 is processed by threshold.

The imaging method can be switched by user input. Meta information on an image such as an ID of a target structure and an ID of an original image, and information on the function groups 500 to 508 are displayed in a part 524. Further, a user-defined object establishment threshold referred to in the threshold processing function 508 is defined by a part 525, and the synthetic weight value referred to in the weighted synthesis ratio setting function 506 is defined by a part 526. Further, the processing flow of the area detection unit 8 selected in the area detection unit type selection function 504 and the processing flow of the detail detection unit 2 selected in the detail detection unit type selection function 505 are defined by a part 520 and a part 521.

With use of the configuration and function of the GUI unit described above, the user browses the output of the segmentation map, edits the segmentation map as appropriate, changes various parameters, changes the processing flow of the detection unit, and analyzes and refines the results.

According to this embodiment, the detail detection unit obtains the local detection map that detects the detection object by using only the local information from the inference image, the area detection unit obtains the area detection map that detects the area including the detection object from the inference image by inference based on learning data, and the result integration processing unit integrates the local detection map determined by the detail detection unit with the area detection map determined by the area detection unit to output the segmentation map indicating which pixel in the image corresponds to the detection object as a probability map. Therefore, a reduction in the inference accuracy of the object detection system can be suppressed even without giving the detailed information when creating the learning data. Even if the pixel fully specified type annotation that provides a correct answer to all pixels in the image as in the conventional art is replaced with the area specified type annotation that provides a rough area of the object in the image as the correct answer, a reduction in the detection accuracy can be suppressed, and the cost of creating learning data can be reduced.

Second Embodiment

Figure 9:
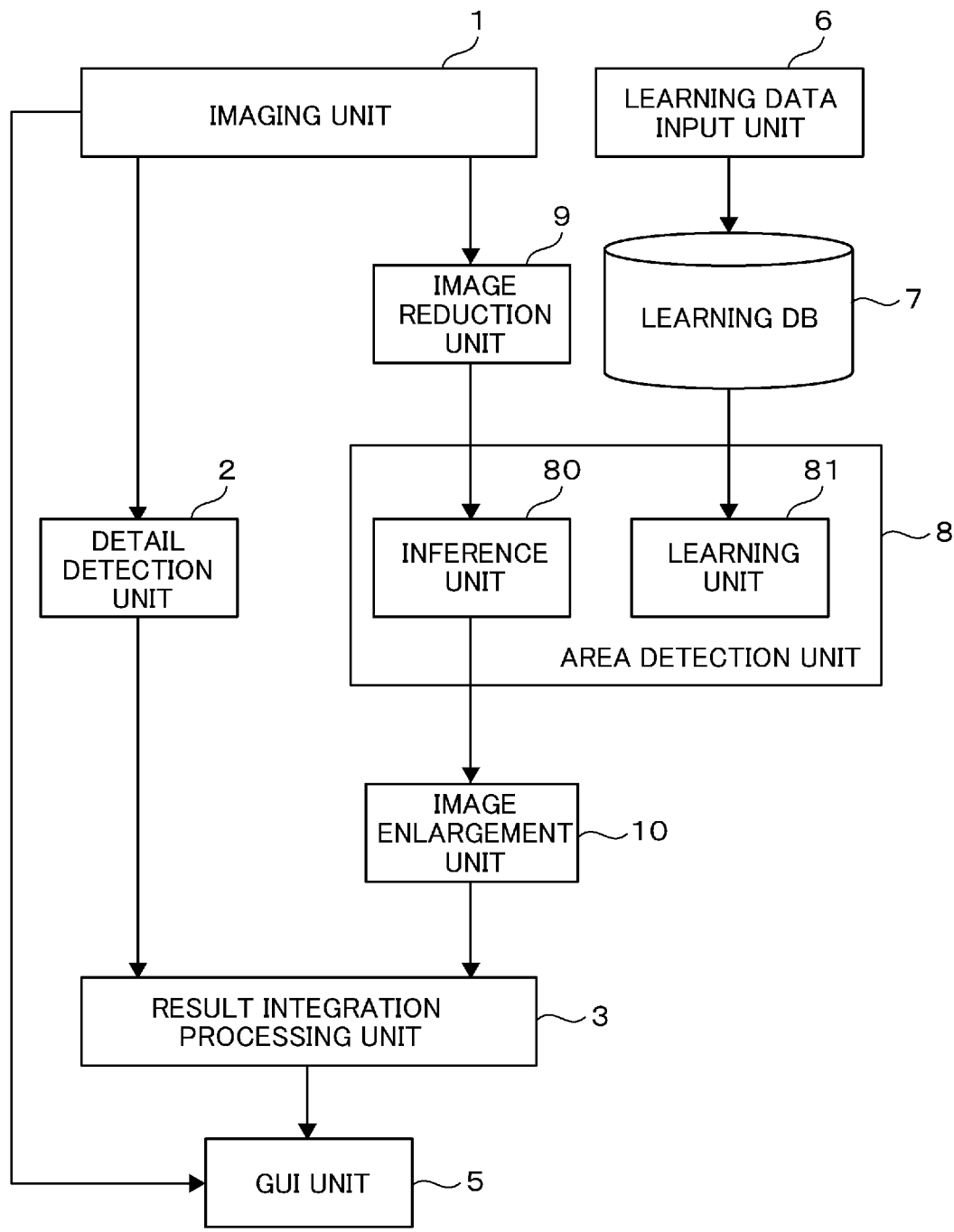
FIG. 9 is a diagram showing a configuration of a pixel-level object detection system according to a second embodiment.

Hereinafter, a second embodiment of the present invention will be described in detail with reference to the drawings. FIG. 9 is a diagram showing a configuration of a pixel-level object detection system in the second embodiment of the present invention.

This embodiment is configured based on the first embodiment, and as a change, this embodiment includes an image reduction unit 9 that reduces the size of an input image and an image enlargement unit 10 that increases the size of the input image. An inference image from the imaging unit 1 is reduced in image size by the image reduction unit 9 and sent to the area detection unit 8. Further, an area detection map from the area detection unit 8 is enlarged in image size by the image enlargement unit 10, and sent to the result integration processing unit 3. With addition of those components, the number of pixels to be processed by the area detection unit 8 is reduced, and a time required for calculation processing can be reduced. Further, the area detection map output by the image enlargement unit 10 is coarser than the area detection map when the image size is not changed due to the effect of reducing or enlarging the inference image size. However, since detailed information is complemented from the detail detection unit 2, the low accuracy can be suppressed.

According to this embodiment, with provision of the image reduction unit 9 that reduces the size of the input image, the number of pixels to be processed by the area detection unit 8 is reduced, and the time required for calculation processing can be reduced.

Third Embodiment

Hereinafter, a third embodiment of the present invention will be described in detail with reference to the drawings. In the third embodiment, an artificial structure such as a building or road is assumed as an inference image, and a segmentation map output is a structure deterioration detection system that represents a probability of deterioration per pixel such as cracks, rust, and paint baldness.

Figure 10:
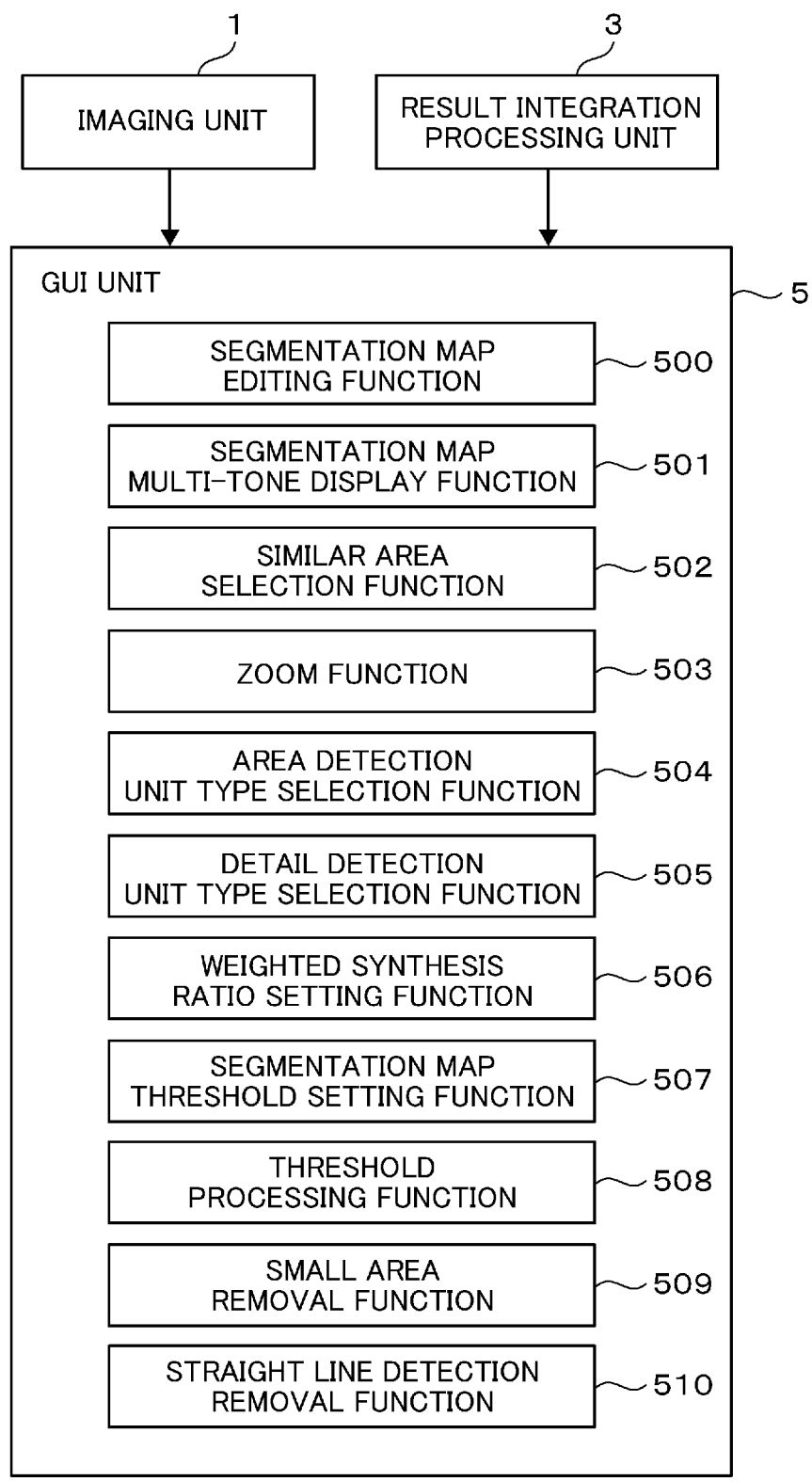
FIG. 10 is a diagram showing a configuration of a GUI unit of a third embodiment and a relationship of the GUI unit with other units.

FIG. 10 is a diagram showing a configuration of the GUI unit 5 and a relationship of the GUI unit 5 with other units in the third embodiment. The GUI unit 5 accepts an inference image output from the imaging unit 1 as well as a segmentation map output from the result integration processing unit 3 as an input. The GUI unit 5 takes the form of a GUI and has a function to be described below so that a person (user) who operates the GUI can efficiently view the detection results.

As in FIG. 7 of the first embodiment, the GUI includes the segmentation map multi-tone display function 501 that displays the probability that each pixel corresponds to an object, which is defined by the segmentation map, as a multi-tone image, and also includes a threshold processing function 508 that threshold-processes the segmentation map by a threshold specified by the user from the segmentation map setting function 507. The GUI also includes the similar area selection function 502 that allows similar pixels to be selected at once based on RGB information of an original image or probability information defined in the segmentation map. Further, the GUI includes the zoom function 503 that enlarges and displays a partial area of a display image by the user's operation. Further, the GUI includes the area detection unit type selection function 504 for changing a processing flow of the area detection unit 8 as well as the detail detection unit type selection function 505 for changing the processing flow of the detail detection unit 2. Further, the GUI includes a segmentation map editing function 500 for editing the input segmentation map and the weighted synthesis ratio setting function 506 described above.

Furthermore, the GUI unit 5 in the third embodiment includes a small area removal function 509 that removes an area whose dimensions are smaller than a predetermined threshold value when pixels having the same deterioration type and adjacent to each other are defined as an area (detection area) in the detection result. This function does not display, for example, fine cracks that do not greatly affect the strength of a building. Further, the GUI unit 5 includes a straight line detection removal function 510 that removes the detection area when the shape of the detection area is linear. This function does not display the linear shape because it is considered that there are no linear cracks.

Figure 11:
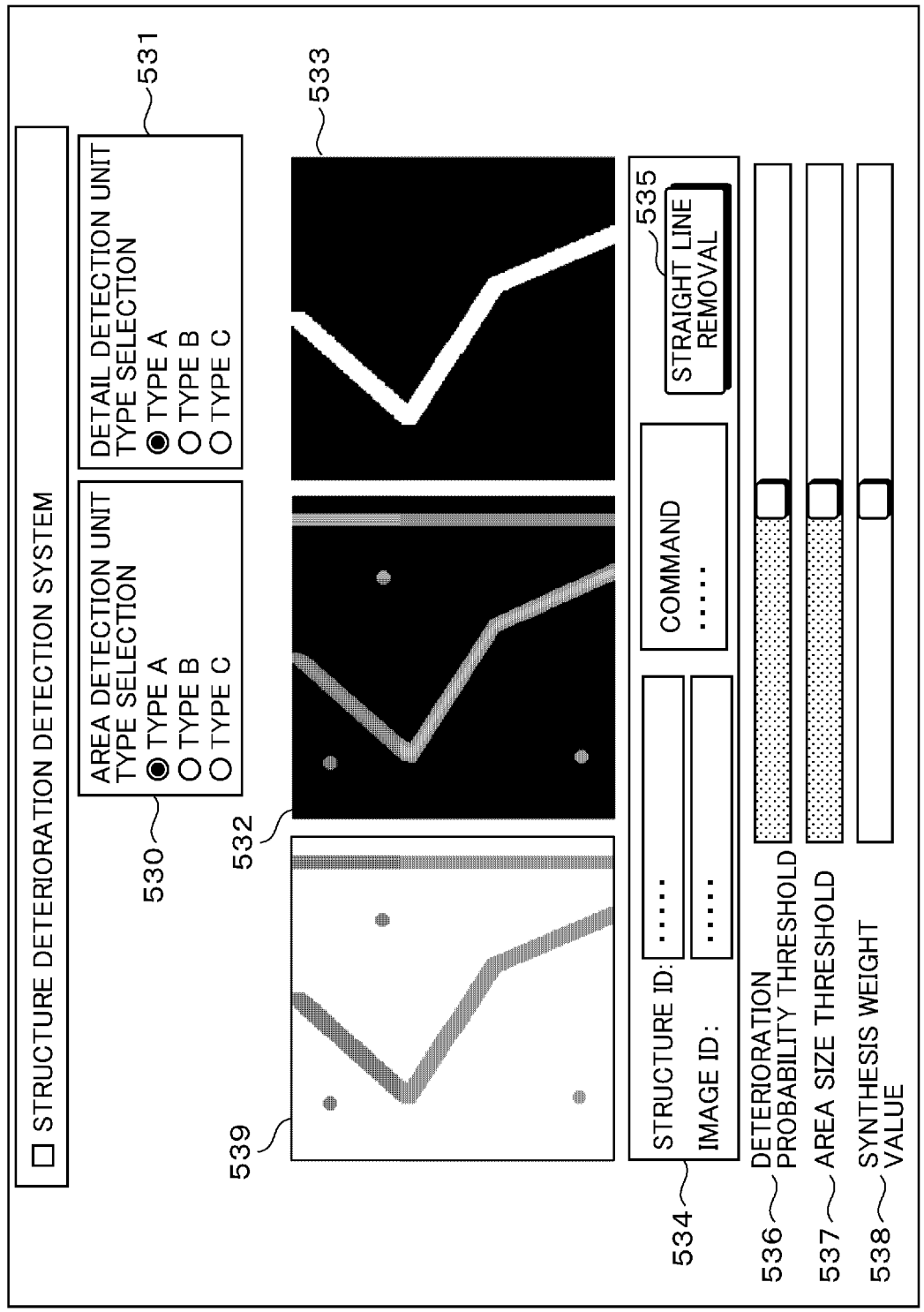
FIG. 11 is a diagram showing a display example of a GUI screen according to the third embodiment.

FIG. 11 shows the details of a screen in which the GUI unit 5 is visualized as a GUI in the third embodiment. First, the GUI displays an inference image represented by a part 539, a segmentation map multi-tone display image that visualizes the "deterioration characteristics" of each pixel by making a structure deterioration probability represented by a part 532 proportional to a pixel value, and a threshold-processed image in which a multi-tone image represented by a part 533 is processed by threshold. The imaging method can be switched by user input. Meta information of the image such as the ID of the target structure and the ID of the original image, and information on the function groups 500 to 508 are displayed in a part 534. Further, a user-defined deterioration probability threshold referred to in the threshold processing function 508 is defined by a component 536, and a synthetic weight value referred to in the weighted synthesis ratio setting function 506 is defined by a part 538. Further, a processing flow of the area detection unit 8 is defined by a part 530, and a processing flow of the detail detection unit is defined by a part 531.

Furthermore, an area size threshold used in the small area removal function 509 is defined by a component 537, and whether or not the linear removal processing of the straight line detection removal function 510 is performed is defined by a part 535.

In a GUI screen of FIG. 11, with use of the small area removal function 509 and the straight line detection removal function 510, the small area and the straight line of the segmentation map multi-tone display image 532 are removed in the threshold-processed image 533.

According to this embodiment, when used in a structure deterioration detection system, deterioration of a structure such as cracks, rust, and paint baldness can be satisfactorily detected.

Fourth Embodiment

Hereinafter, a fourth embodiment of the present invention will be described in detail with reference to the drawing. In the fourth embodiment, assuming crops such as tomatoes and cucumbers as inference images, an output segmentation map is a crop detection system representing the probability of existence of pixel units of a target crop and the degree of growth thereof.

Figure 12:
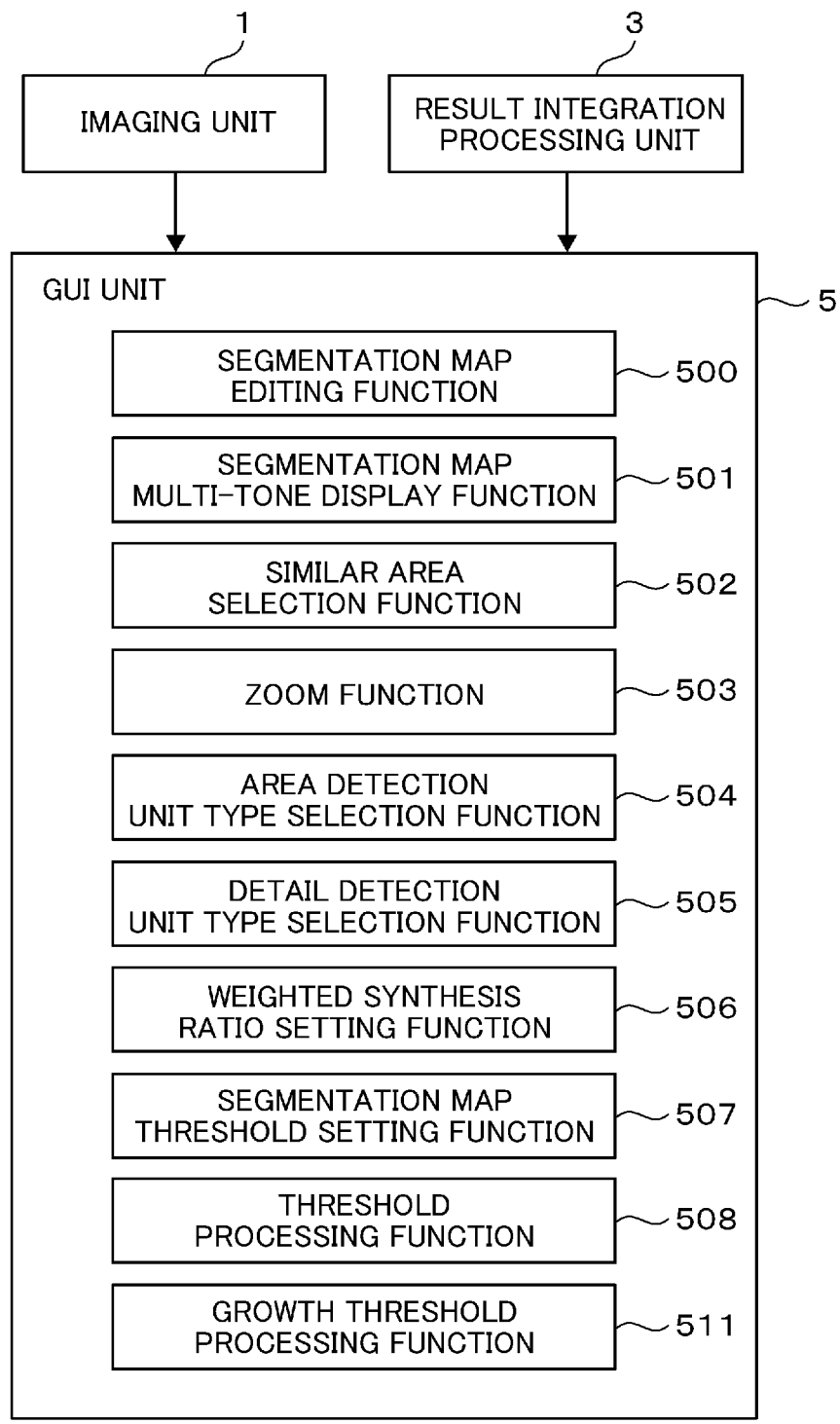
FIG. 12 is a diagram showing a configuration of a GUI unit of a fourth embodiment and a relationship of the GUI unit with other units.

FIG. 12 is a diagram showing a configuration of the GUI unit 5 and a relationship of the GUI unit 5 to other units in the fourth embodiment. The GUI unit 5 receives a segmentation map output from the result integration processing unit 3 in addition to an inference image output from the imaging unit 1 as an input. The GUI unit 5 takes the form of a GUI and has a function to be described below so that a person (user) who operates the GUI can efficiently view the detection results.

As in FIG. 7 of the first embodiment, the GUI includes the segmentation map multi-tone display function 501 that displays the probability that each pixel corresponds to an object, which is defined by the segmentation map, as a multi-tone image, and also includes the threshold processing function 508 that threshold-processes the segmentation map by a threshold specified by the user from the segmentation map setting function 507. The GUI also includes the similar area selection function 502 that allows similar pixels to be selected at once based on RGB information of an original image or probability information defined in the segmentation map. Further, the GUI includes the zoom function 503 that enlarges and displays a partial area of a display image by the user's operation. Further, the GUI includes the area detection unit type selection function 504 for changing a processing flow of the area detection unit 8 as well as the detail detection unit type selection function 505 for changing the processing flow of the detail detection unit 2. Further, the GUI includes the segmentation map editing function 500 for editing the input segmentation map and the weighted synthesis ratio setting function 506 described above.

Furthermore, the GUI unit 5 in the fourth embodiment specifically includes a growth level threshold processing function 511 that removes crops each with an immature growth degree from the detection results.

FIG. 13 shows the details of a screen in which the GUI unit 5 in the fourth embodiment is visualized as a GUI. First, the GUI screen displays an inference image (original image) represented by a part 548, a segmentation map multi-tone display image that visualizes the "crop-likeness" of each pixel by making an agricultural product probability proportional to a pixel value represented by a part 542, and a threshold-processed image in which a multi-tone image represented by a part 543 is processed by threshold.

The imaging method can be switched by user input. Meta information on the images such as the ID of the target crop and the ID of the original image, and information on the function groups 500 to 508 are displayed in a part 544. Further, the user-defined object probability threshold referred to in the threshold processing function 508 is defined by a component 545, and a synthetic weight value referred to in the weighted synthesis ratio setting function 506 is defined by a part 547. Further, the processing flow of the area detection unit 8 is defined by a part 540, and the processing flow of the detail detection unit is defined by a part 541.

Furthermore, the growth threshold used in the growth threshold processing function 511 is defined by a part 546.

In the GUI screen of FIG. 13, with use of the growth threshold processing function 511, an image of an apple that is a grown agricultural product is displayed in the threshold-processed image 543. Immature apples below the threshold are not displayed.

According to this embodiment, when used in the agricultural product detection system, the grown agricultural product can be detected well.

Fifth Embodiment

Hereinafter, a fifth embodiment of the present invention will be described in detail with reference to the drawings. FIG. 14 is a diagram showing a configuration of a pixel-level object detection system in the fifth embodiment of the present invention. This embodiment is configured based on the first embodiment, and as a change, a learning data creation unit 11 for processing before inputting an output of the learning data input unit 6 into the learning DB 7 has been added.

FIG. 15 shows a configuration of the learning data creation unit 11 and a relationship of the learning data creation unit with other units in the fifth embodiment.

The learning data creation unit 11 provides detailed information to correct answer data by integrating an output from a second detail detection unit 200 receiving an input from the learning image input unit 60 and an input from the correct answer data input unit 61 by using a second result integration processing unit 300. The operation of the second detail detection unit 200 and the second result integrated processing unit 300 is the same as that of the detail detection unit 2 and the result integration processing unit 3 in the first embodiment. The output of the second result integration processing unit 300 is output to a learning DB 7 as detailed correct answer data.

Further, in this embodiment, an output of the correct answer data input unit 61, which is not processed by the learning data creation unit 11, is also output to the learning DB 7.

According to this embodiment, in the second detail detection unit 200, the detection target is detected using only local information from the learning image, and in the second result integrated processing unit 300, the local detection result determined in the second detail detection unit 200 and the correct answer data input in the correct answer data input unit 61 are integrated to create the learning data. Therefore, even if an area specified type annotation that provides a rough area of the object in the image as a correct answer with the input of the correct answer data is used, a decrease in detection accuracy can be suppressed, and the learning data creation cost can be reduced.

The program according to the present invention is directed to a program that is incorporated into a computer and operates a computer as a pixel-level object detection system. A pixel-level object detection system shown in a block diagram shown in FIG. 1, etc. are configured by incorporating the program of the present invention into the computer.

Since the program is executed by a processor (for example, a CPU, a GPU), specified processing is appropriately performed using storage resources (for example, memory) and/or interface devices (for example, communication ports), so that a subject of processing may be a processor. Similarly, the subject of the processing performed by executing the program may be a computer, a controller, a device, a system, a computer, or a node each having a processor. The subject of the processing performed by executing the program may be an arithmetic unit, and may include a dedicated circuit (for example, FPGA or ASIC) that performs specific processing.

The program may be installed on a device such as a calculator from a program source. The program source may be, for example, a storage media that can be read by a program distribution server or computer. If the program source is a program distribution server, the program distribution server may include a processor and a storage resource that stores a program to be distributed, and the processor of the program distribution server may distribute the program to be distributed to other computers. In addition, two or more programs may be realized as one program, and one program may be realized as two or more programs.

As described above, the present invention has been specifically described based on the embodiments, but the present invention is not limited to the above embodiments, and various changes can be made without departing from the spirit of the present invention.

What is claimed is:

1. A pixel-level object detection system that detects an object at a pixel level, comprising:
   an imaging unit that acquires an inference image that is an image that captures a detection target;
   an area detection unit that detects an area including a detection target from the inference image;
   a detail detection unit that detects the detection target using only local information from the inference image;
   a result integration processing unit that integrates an output of the area detection unit with an output of the detail detection unit to output a segmentation map indicating, as a probability map, which pixel in the image corresponds to the detection object;
   an image reduction unit that reduces a resolution of the inference image output by the imaging unit and inputs the reduced resolution to the area detection unit; and
   an image enlargement unit that enlarges an area detection map output from the area detection unit.

2. The pixel-level object detection system according to claim 1,
   wherein the detail detection unit detects the detection target using one pixel or a small number of pixels, and
   the area detection unit detects the area including the detection target using more pixels than the pixel or pixels used by the detail detection unit.

3. The pixel-level object detection system according to claim 1, further comprising:
   a learning data input unit that outputs learning data that is an aggregation of pairs of learning images that are an image group acquired in advance and correct answer data including information on whether or not the pixels correspond to the object; and
   a learning database that holds the learning data,
   wherein the area detection unit includes a learning unit that generates an inference unit which infers pixels corresponding to the object by machine learning using the learning data of the learning database, and the inference unit executes processing of detecting the area including the detection target from the inference image.

4. The pixel-level object detection system according to claim 3, further comprising a learning data creation unit that creates the learning data,
   wherein a learning data creation unit includes:
   a second detail detection unit that detects the detection target from the learning images using only local information; and
   a second result integration processing unit that integrates a local detection result obtained by the second detail detection unit and the correct answer data input by the correct answer data input unit, and
   the learning data creation unit refines the correct answer data.

5. The pixel-level object detection system according to claim 1,
   wherein the detail detection unit includes at least one of:
   a preprocessing function of performing preprocessing;
   a pixel brightness calculation function of calculating a brightness of pixels included in the inference image; and
   a pixel distance calculation function of calculating a distance between any pixel value and each pixel value of the inference image.

6. The pixel-level object detection system according to claim 1, further comprising a Graphic User Interface (GUI) unit that displays the segmentation map output on a screen,
   wherein the GUI unit performs at least one of:
   processing of displaying the segmentation map output as a colored multi-tone image based on an object probability value output from the result integration processing unit on the screen;
   processing of enlarging a part of the screen on the screen;
   similar area selection processing of being capable at once of selecting adjacent pixel groups determined to be the same object on the screen;
   processing of performing threshold processing on the segmentation output based on an object estimation probability value on the above screen; and
   processing of editing the segmentation map.

7. The pixel-level object detection system according to claim 1, further comprising a Graphic User Interface (GUI) unit that displays the segmentation map output on the screen,
   wherein the GUI unit displays at least one of:
   a first part that sets a threshold required for the threshold processing;
   a second part that sets a type of the area detection unit;
   a third part that sets a type of the detail detection unit; and
   a fourth part that sets a threshold required when the result integration processing unit integrates a local detection map with the area detection map.

8. The pixel-level object detection system according to claim 1,
   wherein the result integration processing unit includes a Graphic User Interface (GUI) unit that outputs a structural deterioration degree as the segmentation map, and displays the segmentation map on a screen, and
   the GUI unit includes:
   a function of being capable of removing adjacent pixel groups which are determined to be the same object and whose area size is small among threshold-processed detection results, and
   a straight-line removal function of removing a threshold-processed detection area whose shape is a straight line.

9. The pixel-level object detection system according to claim 1,
   wherein the result integration processing unit includes a Graphic User Interface (GUI) unit that outputs a growth probability of crops as a segmentation map, and displays the segmentation map on a screen, and
   the GUI unit includes a function of removing the crops at a slow growth level in threshold-processed detection results.

10. A non-transitory computer readable medium storing a program causing a computer to function as a pixel-level object detection system comprising:
   an area detection unit that detects an area including a detection target from an inference image;
   a detail detection unit that detects the detection target using only local information from the inference image;

a result integration processing unit that integrates an output of the area detection unit with an output of the detail detection unit to output a segmentation map indicating, as a probability map, which pixel in the image corresponds to a detection object;

an image reduction unit that reduces a resolution of the inference image output by the imaging unit and inputs the reduced resolution to the area detection unit; and an image enlargement unit that enlarges an area detection map output from the area detection unit.

11. The non-transitory computer readable medium storing the program according to claim 10, wherein the program functions as the pixel-level object detection system in which the area detection unit includes a learning unit that generates an inference unit which infers pixels corresponding to an object by machine learning using learning data of a learning database, and the inference unit performs processing of detecting an area including the detection object from the inference image.

12. The non-transitory computer readable medium storing the program according to claim 11, wherein the program functions as the pixel-level object detection system including a learning data creation unit that includes a second detail detection unit that detects the detection target using only local information from the learning image and a second result integration processing unit that integrates a local detection result determined in the second detail detection unit and correct answer data input in a correct answer data input unit, and refines the correct answer data.

* * * * *